United States Patent [19]

Hafner et al.

[11] Patent Number: 4,630,644
[45] Date of Patent: Dec. 23, 1986

[54] DUAL OPERATED METERING VALVE CONNECTED TO BOTH A HAND OPERATED PUSH BUTTON AND A FOOT OPERATED PUSH BUTTON

[75] Inventors: V. Walter Hafner, Whittier; Ron T. Hahn, Fullerton; Keith D. Marshall, Whittier; Theodore J. Sally, Graton, all of Calif.

[73] Assignee: Acorn Engineering Company, City of Industry, Calif.

[21] Appl. No.: 822,392

[22] Filed: Jan. 27, 1986

[51] Int. Cl.⁴ .......................................... F16K 31/326
[52] U.S. Cl. .................... 137/624.11; 251/20; 251/28; 251/57; 251/289; 251/295; 251/65
[58] Field of Search .................... 251/15, 20, 25, 28, 251/45, 48, 57, 65, 289, 295; 137/624.11

[56] References Cited

U.S. PATENT DOCUMENTS

| | | | |
|---|---|---|---|
| 2,839,264 | 6/1958 | Trubert | 251/57 |
| 2,966,328 | 12/1960 | Burnworth | 251/289 X |
| 2,997,851 | 8/1961 | Trubert et al. | 251/57 X |
| 3,117,761 | 1/1965 | Billeter | 251/57 |

Primary Examiner—Alan Cohan
Attorney, Agent, or Firm—Edgar W. Averill, Jr.

[57] ABSTRACT

An improved, remote controlled valve and dual push button assembly, having a hand operated push button which, when depressed and released, opens a water valve for a predetermined length of time after which the valve closes. The valve is also connected to a foot operated push button which, when depressed, holds the valve in an open configuration as long as the foot button is depressed. The improved valve and button assembly provides an air flow path through the foot button when the foot button is not depressed. The air flow path utilizes a hole in a diaphragm of the foot button which communicates with an air flow path in the base of the piston which depresses the foot button diaphragm. The disclosure also includes a check valve held in the needle valve which is a part of the timing mechanism of the hand operated button. The check valve prevents the flow of air out through the needle valve and permits air to only flow in through the needle valve.

8 Claims, 12 Drawing Figures

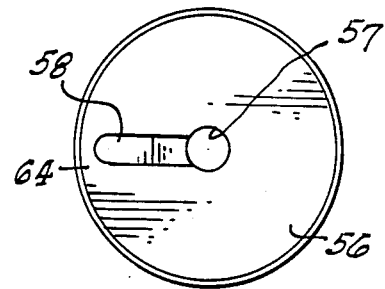
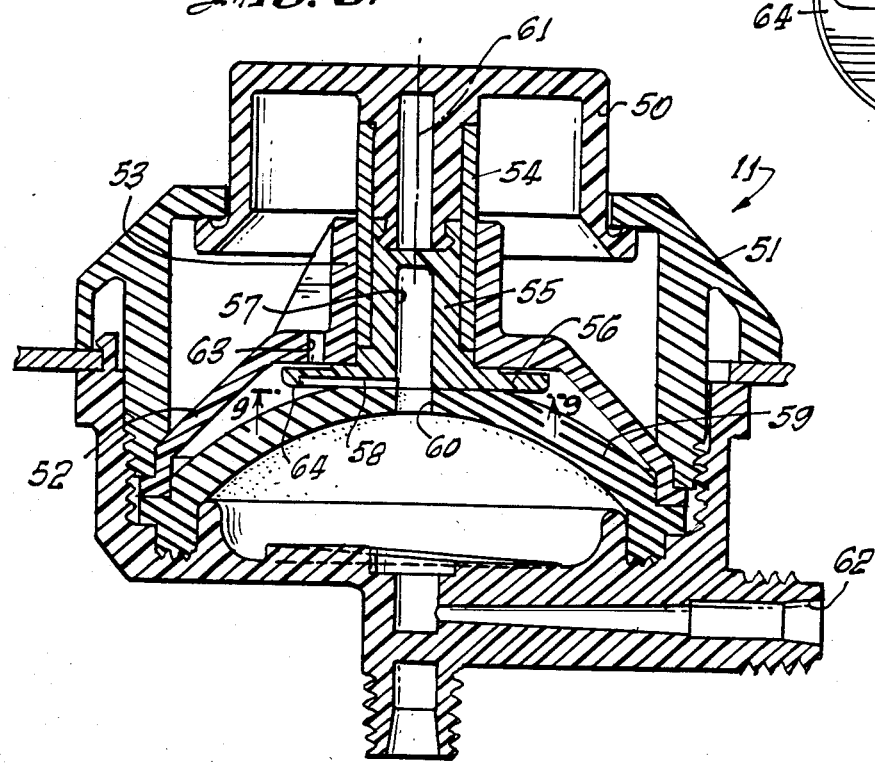
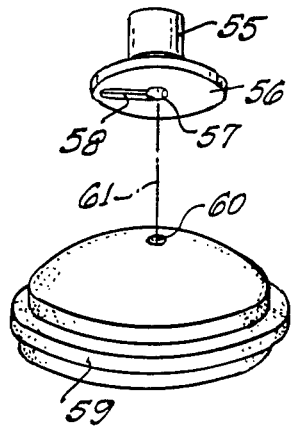
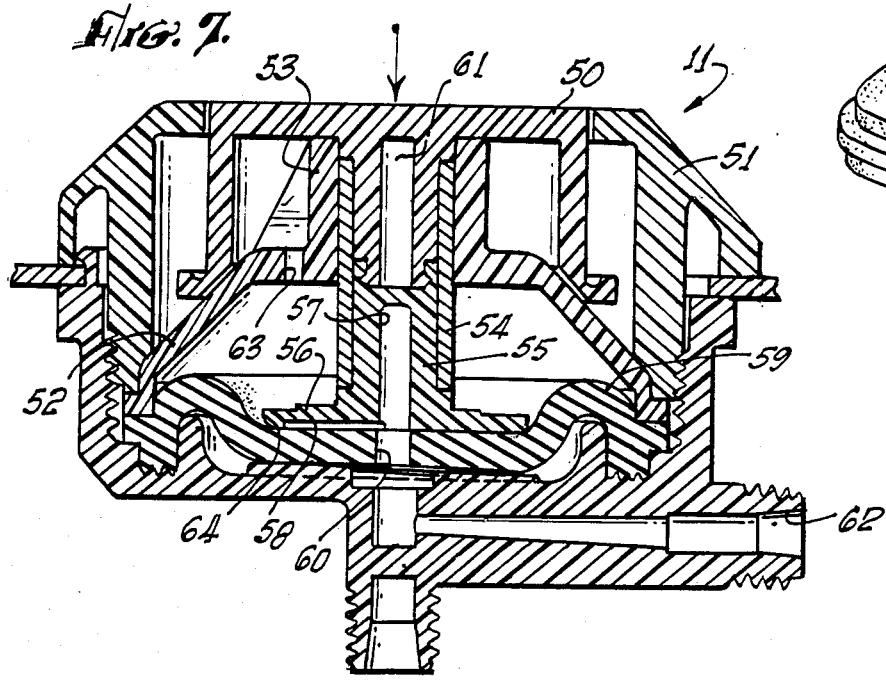

DUAL OPERATED METERING VALVE CONNECTED TO BOTH A HAND OPERATED PUSH BUTTON AND A FOOT OPERATED PUSH BUTTON

BACKGROUND OF THE DISCLOSURE

The field of the invention is valves, and the invention relates more particularly to remote controlled valves which are operated by injecting or withdrawing small volumes of air into a diaphragm-containing control valve.

Applicants' assignee is filing a patent application showing a hand operated push button assembly and a foot operated push button assembly connectable to a remotely controlled valve, which application was filed on the same day as the present application and is identified by Ser. No. 823,393. This application describes in detail the construction and operation of both the hand operated push button and the foot operated push button in conjunction with the remotely controlled valve. The specification of that application is incorporated by reference to provide further non-essential information on the details of construction of the push button. Although the push button and valve assembly described therein operates satisfactorily either with the hand button, alone, or with the foot button, alone, for some applications, it is beneficial to provide operation by either the hand button for a timed volume of water or by the foot button for a continued flow of water as long as the foot button is depressed. Unfortunately, the connection of both the hand and foot button to the same valve provided an inoperative device for several reasons. The hand operated button operates by expelling a small volume of air as the push button is depressed, and the opening of the valve is caused only when the push button is released and a volume of air is extracted from below the diaphragm of the remotely controlled valve. In order for the push button to operate, there must be some means for the air to escape when the hand operated push button is depressed. When the remotely controlled valve is operated only by the hand operated push button, the upper chamber of the controlled valve is simply left open to the atmosphere. This, however, would make the foot operated button inoperative since pressure must be maintained in the upper chamber of the controlled valve to hold it open. Furthermore, the timing of the hand operated push button results from the metered entry of air through a needle valve into the lower chamber which eventually equalizes the pressure on both sides of the diaphragm of the remotely controlled valve causing it to close. However, when the foot button is held in a downward position, air flows into the upper chamber of the remote pneumatic servomotor and a volume of air from below the diaphragm in the remote pneumatic servomotor flowed outwardly through the needle valve reducing the pressure below the diaphragm. When the foot button is released, the pressure below the diaphragm has become insufficient to cause the diaphragm to return to its neutral position opening the valve and, therefore, the valve stays open for a timed period after the foot button is released. This resulted in unsatisfactory operation of the foot operated button.

There is, thus, a need for an assembly which may be operated by either a hand operated push button causing a timed opening of a water valve and a foot operated push button which causes the water valve to remain open as long as the foot button is depressed.

SUMMARY OF THE INVENTION

It is an object of the present invention to provide a remote controlled valve and dual push button assembly which is capable of operating in a timed manner with the hand operated push button and in a held-open manner by the depression of a foot operated button.

The present invention is for an improved, remote controlled valve and dual push button assembly. The remote controlled valve is of the type which has a valve diaphragm including a closeable opening therethrough, the valve diaphragm being located in the middle of a chamber, which diaphragm divides the chamber into an upper chamber and a lower chamber. When the valve diaphragm moves downwardly, a magnet attracts a pilot orifice plate positioned below the lower chamber causing the valve to open. When the pressure on both sides of the valve diaphragm is equal, the valve diaphragm moves upwardly releasing the pilot orifice plate thereby closing the valve. One push button connected to the valve is a hand operated push button of the type which contains a hand button diaphragm which, when depressed, ejects a small volume of air and then, when released, intakes the same volume of air. The hand operated push button is connected to the lower of the chambers, and upon intake, pulls the valve diaphragm downwardly causing the magnet to attract the pilot orifice plate thereby holding the valve open for an amount of time required for metered air to pass through a needle valve to release the valve diaphragm and thereby the pilot orifice plate. A second push button is also connected to the remote controlled valve and is of the type which is operated by foot. The foot operated push button has a foot button diaphragm which, when depressed by a piston, ejects a small volume of control air which passes to the upper of the chambers and holds the diaphragm downwardly causing the magnet to attract the pilot orifice plate thereby raising the pilot orifice plate for as long as the foot button is held down. An air vent is provided in the foot operated button to permit the escape of air initiated by the depressing of the hand operated push button. This allows air which is passed through the closeable opening in the valve diaphragm, resulting from the depressing of the hand operated push button, to escape through the foot operated button when the foot operated button is in its non-depressed configuration. The air vent in the foot operated button comprises an opening through the foot button diaphragm at about the axial center thereof. The piston of the foot operated push button has a circular, dish-like contact face which contacts the diaphragm when the piston is depressed. The piston has at least one groove passing from about the center thereof, extending away from the center an amount sufficient to provide free passage of air from the opening in the foot button diaphragm, along the groove to the exterior of the foot button diaphragm when the piston is in its uppermost or non-depressed position. The groove does not extend to the exterior periphery of the contact face of the piston so that, when the piston is held in its downward position, no air escapes through the opening in the foot button diaphragm. Preferably, the needle valve timer which controls the amount of time the valve stays open after the depressing and releasing of the hand operated push button contains a check valve to prevent the escape of air through the needle valve when the foot button is being held down. The pressure below the valve actuating diaphragm 17 is, thus, retained so that upon release of the foot button, the valve will immediately close.

BRIEF DESCRIPTION OF THE DRAWINGS

FIG. 6 is an enlarged cross-sectional view of the foot button of the dual push button assembly of FIG. 1.

FIG. 7 is a cross-sectional view of the foot button of FIG. 6 showing the foot button in a depressed configuration.

FIG. 8 is an exploded perspective view of the diaphragm and piston of the foot button of FIG. 6.

FIG. 9 is a bottom plan view taken along line 9—9 of FIG. 6.

DESCRIPTION OF THE PREFERRED EMBODIMENTS

Figure 1:
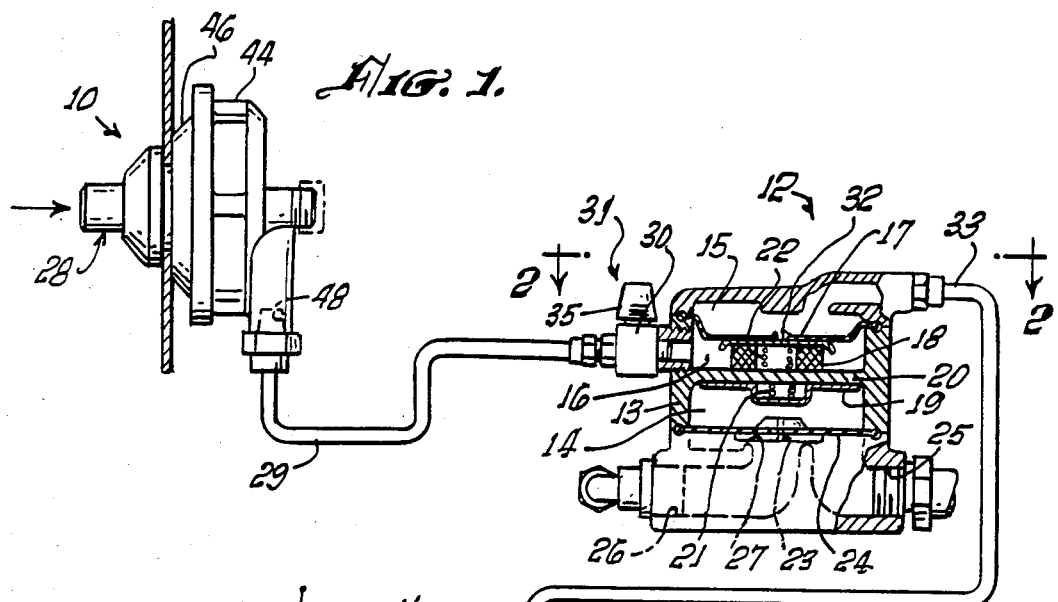
FIG. 1 is a side view, partly in cross-section of the improved, remote controlled valve and dual push button assembly of the present invention.
Figure 2:
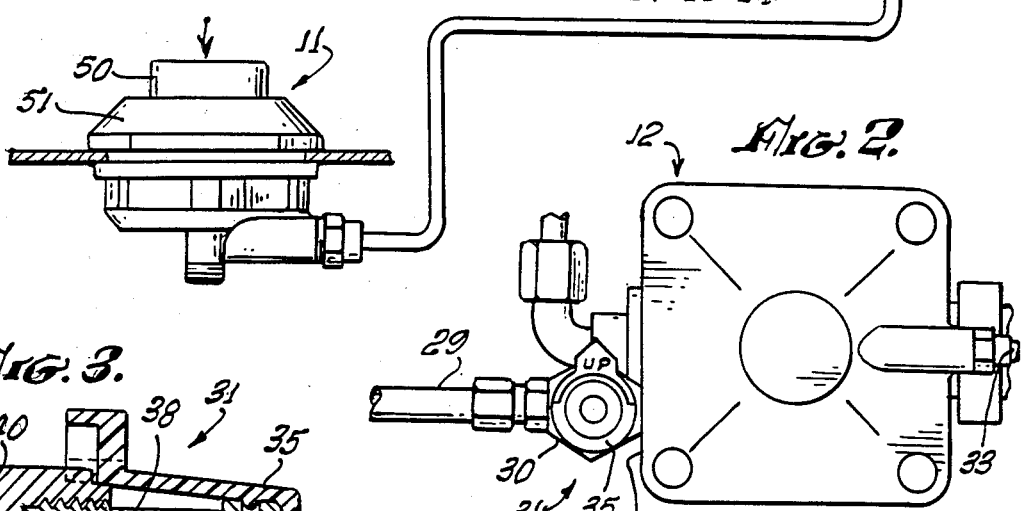
FIG. 2 is an enlarged plan view of the remote controlled valve of FIG. 1.
Figure 3:
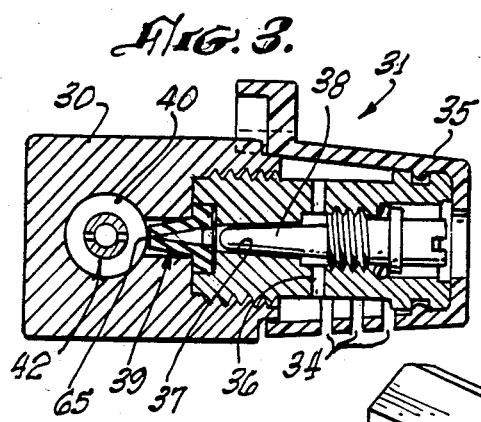
FIG. 3 is an enlarged cross-sectional view of the needle valve assembly of the remote controlled valve assembly of FIG. 1.

The improved, remote controlled valve and dual push button assembly is shown in FIG. 1 and, broadly, is made up of three elements, namely, a hand operated push button 10, a foot operated push button 11 and a remote controlled valve 12 which includes a timer. Valve 12 has a valve body 13 which has a lower valve chamber 14 and an upper pneumatic servomotor chamber which, in turn, is divided into an upper chamber 15 and a lower chamber 16 by an actuating diaphragm 17. Actuating diaphragm 17 supports a magnet 18 which, when it is in its lower position as shown in FIG. 1, attracts a pilot orifice plate 19. Pilot orifice plate 19 is urged away from partition 20 of valve body 13 by a spring 21. Similarly, magnet 18 is urged away from partition 20 by a spring 22. Thus, when the pressure in lower chamber 16 equals the pressure in upper chamber 15, spring 22 is strong enough to move magnet 18 away from partition 20, and pilot orifice plate 19 moves downwardly to cover pilot orifice 23 in seat diaphragm 24. Water enters valve body 13 through opening 25. When the pilot orifice plate 19 is in its upward position as shown in FIG. 1, water seeps through pilot orifice 23, reducing the water pressure in valve chamber 14 and causing the incoming water to force seat diaphragm 24 upwardly, permitting it to pass around valve seat 27 and out exit port 26. Pilot operated diaphragm valves are in use but the means to cause a desired movement of actuating diaphragm 17 is the subject of the improvement of the present invention.

Figure 4:
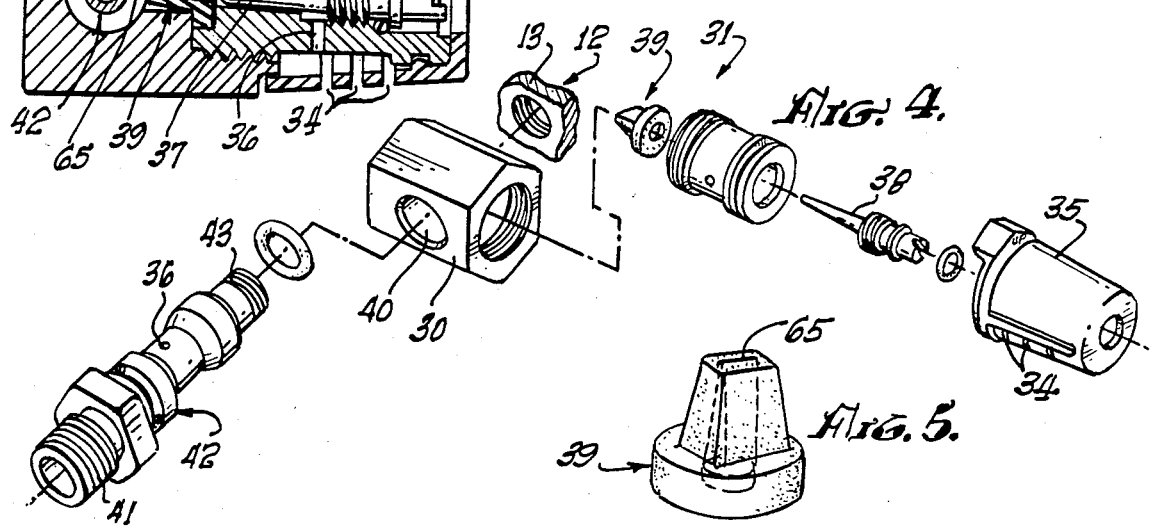
FIG. 4 is an exploded perspective view of the needle valve assembly of FIG. 3.
Figure 10:
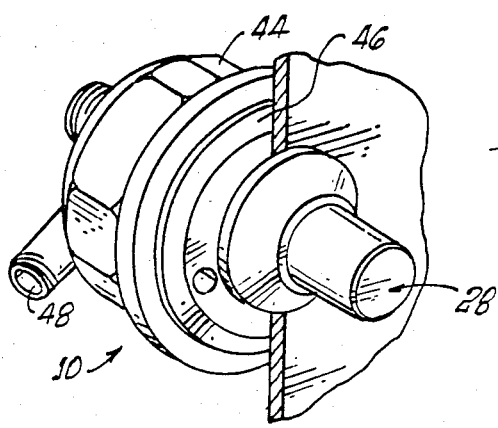
FIG. 10 is a perspective view of the hand operated push button of the dual push button assembly of FIG. 1.
Figure 11:
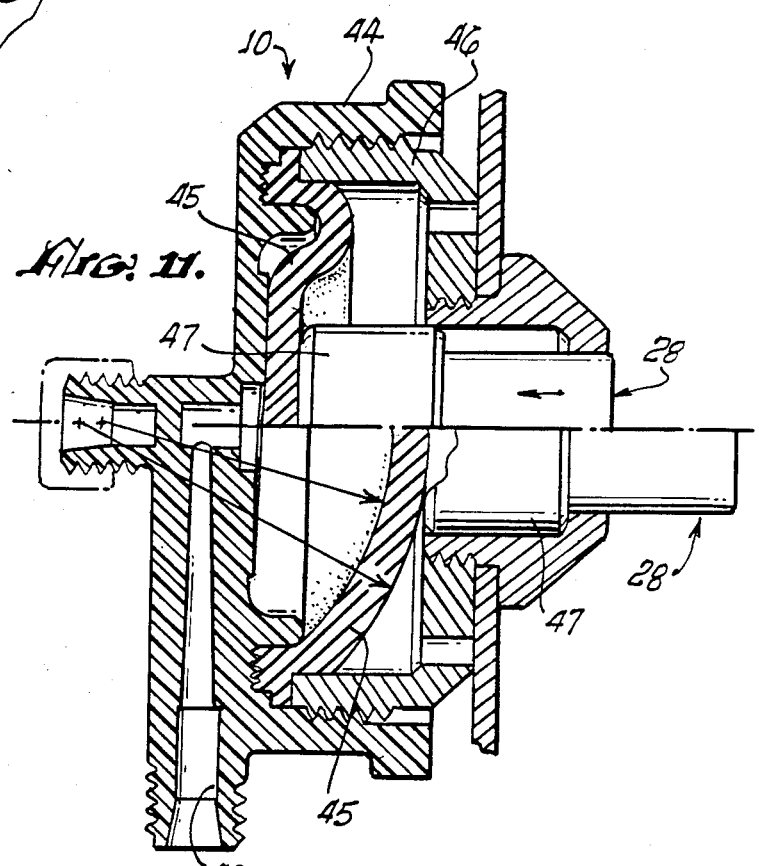
FIG. 11 is an enlarged cross-sectional view of the hand operated push button of FIG. 10.
Figure 12:
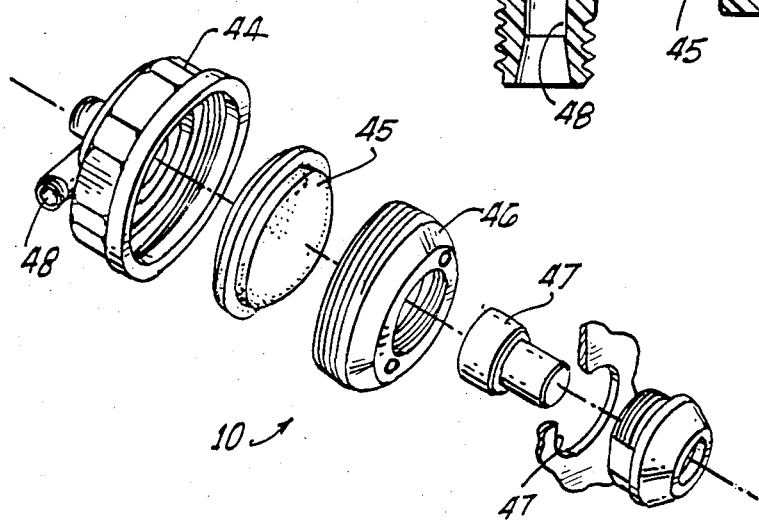
FIG. 12 is an exploded perspective view of the hand operated push button of FIG. 10.

In a manner similar to that pointed out in applicant's above-referenced patent application for push button assembly construction, and as shown in detail in FIGS. 10 through 12, the depression of push button 28 forces a measured volume of air out through air line 29 through the body 30 of needle valve 31 and into lower chamber 16. Although actuating diaphragm 17 is shown in its lower position in normal, at rest, configuration, diaphragm 17 is raised to a flat configuration analogous to that shown for seat diaphragm 24. Incoming air from air line 29 causes diaphragm 17 to raise up and for the air to pass through check valve 32 and out through air line 33 into and through foot operated push button 11 in a manner described in detail below. When hand depressed push button 28 is released, a similar volume of air is pulled back into hand operated push button 10 through air line 29 causing actuating diaphragm 17 to move downwardly into the position shown in FIG. 1. This creates an area of reduced pressure in lower chamber 16 and in air line 29 as well as below the diaphragm in the hand operated push button, and air tends to be pulled back through the needle valve 31. More particularly, air passes through slots 34 in cap 35, through transverse opening 36, into the opening that comprises needle valve seat 37, past needle 38, through check valve 39, and into passageway 40 and from there into air line 29 and lower chamber 16. The details of construction of the needle valve assembly 31 is shown in exploded, perspective view in FIG. 4. Air line 29 is affixed to male fitting 41 of needle valve stem 42 which also has a male fitting 43 which is screwed into a threaded opening in valve body 13.

The construction of the hand operated push button 10 is shown best in FIGS. 10 through 12 where it can be seen that hand operated push button 10 has a lower housing 44 against which a diaphragm 45 is held by a diaphragm sealing element 46. When push button member 28 is depressed, its piston 47 distorts diaphragm 45 forcing air out of opening 48 and into air line 29. Conversely, when push button member 28 is released, diaphragm 45 springs back to its position as shown in the lower half of FIG. 11, thereby pulling a measured amount of air through opening 48 causing the remote controlled valve to open. The construction of hand operated push button 10 is shown clearly in the exploded, perspective view of FIG. 12.

Thus, when the area under diaphragm 45, in air line 29 and in lower chamber 16, has been replenished through needle valve assembly 31, actuating diaphragm 17 raises back to its flat configuration causing pilot orifice plate 19 to move downwardly closing the flow of water through valve seat 27.

The manner of controlling the flow of air outwardly through the foot operated push button 11 is shown in FIGS. 6 through 9 of the drawings. Button 11 can be seen to have a foot button 50 held by a button support and stop cone 52 and an escutcheon member 51. Cone 52 has a support cylinder 53 which holds a sleeve 54 and a piston member 55. Piston member 55 terminates in a disk portion 56 which is shown in bottom plan view in FIG. 9. It can be seen that disk portion 56 has an axially positioned central blind opening 57 and a radially disposed groove 58 which is shown in side view in FIG. 6. It can also be seen that foot button diaphragm 59 has an opening 60 which is positioned along the axial center 61 of diaphragm 59.

Thus, when the piston member 55 is in its upward position, as shown in FIG. 6, air may pass freely from inlet/outlet 62, through opening 60, through radial groove 58 and out through one or more holes 63 in button support and stop cone 52. The tolerances between foot button 50 and escutcheon member 51 are such that air may pass freely between these two members and out into the atmosphere. However, when foot button 50 is depressed, as shown in FIG. 7, it can be seen that the outer edge 64 abuts against the outer surface of diaphragm 59 preventing the flow of air past piston member 55. Thus, as long as foot button 50 is held in its depressed configuration, pressure is maintained in air line 33 and, thus, in upper chamber 15. This holds actuating diaphragm 17 in its downward position, as shown in FIG. 1, holding the pilot orifice plate up and causing seat diaphragm 24 to move upwardly allowing water to pass freely through valve 12. The alignment of the piston member 55, with respect to the diaphragm 59, is indicated clearly in FIG. 8 of the drawings.

Figure 5:
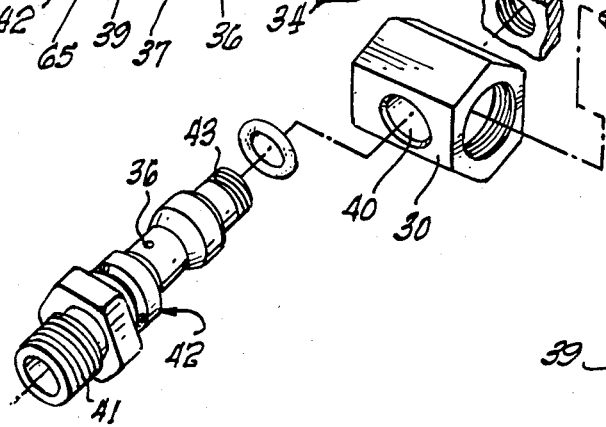
FIG. 5 is an enlarged perspective view of the check valve of the needle valve of FIG. 3.

The check valve 39, shown in FIG. 5, plays an important part in the effective operation of the remote controlled valve assembly of the present invention. As foot button 50 is depressed, as stated above, pressure in upper chamber 15 increases, distorting diaphragm 17 and causing pressure in lower chamber 16 also to increase. There is no place for air to escape through hand button diaphragm 45 since this diaphragm has no hole through it. Check valve 39 prevents the escape of air through its slit 65 and, thus, retains the pressure below actuating diaphragm 17. This is important in that if this pressure is permitted to escape (for instance in the absence of a check valve such as check valve 39), then the pressure soon reduces to atmospheric in chamber 16. Then, when foot button 50 is released, the pressure below actuating diaphragm 17 is sufficiently reduced so that a partial vacuum is formed holding actuating diaphragm 17 down along with magnet 18 preventing pilot orifice plate 19 from dropping. The result is that, without check valve 39, needle valve assembly 31 would actually result in a timing cycle after foot button 50 had been released. That is, the water continues to run for a timed period after the foot button is released thereby wasting water and energy. This is not desirable and is prevented by the provision of check valve 39 within the body of needle valve assembly 31. Check valve 39 has the shape of a flattened cone as shown in FIG. 5 and is fabricated from a flexible material such as an elastomer.

In summary, the assembly of the present invention enables both the operation of the hand operated push button by providing an air path vent through foot button 11, as well as providing a closed chamber below actuating diaphragm 17 so that the foot operated push button will immediately close after the push button 50 is released. Thus, a single valve can be incorporated in a fixture which has both a push button for a timed cycle and a foot operated push button for a continuously held on condition. Of course, the needle 38 can be adjusted to provide an appropriate cycle for the hand operated push button 10.

Although a single groove is shown in disk portion 56 and piston member 55, two or more grooves could alternatively be used. It is necessary, of course, that the grooves form a passageway from the opening in the diaphragm to the atmosphere when the piston member is in its uppermost position. While check valve member 39 is shown in the body of the needle valve, it could be placed in a line between the needle valve and air line 29 or, alternatively, the needle and check valve could be connected to another side of the lower chamber 16 and need not form a portion of air line 29. It is only important that air flow outwardly through needle valve assembly 31 be prevented if it is believed disadvantageous to have some delay in the closing of valve 12 upon the release of push button 50.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved, remote controlled valve and dual push button assembly, the remote controlled valve being of the type which has a valve diaphragm including a closeable opening therethrough, said diaphragm being in the middle of a chamber which divides the chamber into an upper chamber and a lower chamber, wherein when the valve diaphragm moves downwardly, a magnet attracts a pilot orifice plate positioned below said chamber, causing the valve to open, and when the pressure on both sides of the valve diaphragm is equalled, the valve diaphragm moves upwardly releasing the pilot orifice plate, thereby closing the valve and the push buttons connected to said valve being a hand operated push button of the type which contains a hand button diaphragm which, when depressed, ejects a small volume of control air and then, when released, intakes the same volume of air, which hand operated push button is connected to the lower of said chambers and, upon intake, pulls the valve diaphragm downwardly causing the magnet to attract the pilot orifice plate, thereby holding the valve open for an amount of time required for metered air to pass through a needle valve to release the pilot orifice plate, and the second push button being a foot operated button of the type which contains a foot button diaphragm which, when depressed by a piston, ejects a small volume of control air, which foot operated button is connected to the upper of said chambers and when the small volume of air is injected into the upper chamber, the valve diaphragm is moved downwardly for as long as the foot button is held down, wherein the improvement comprises:

air vent means in said foot operated button to permit the escape of air initiated by the depressing of the hand operated push button, which air has passed through the closeable opening in the valve diaphragm, and to allow the escape of such air through said foot operated button when said foot operated button is in its non-depressed configuration, said air vent means comprising:

an opening through the foot button diaphragm at about the axial center thereof; and a piston having a circular contact face which contacts the diaphragm when the piston is depressed, said piston having at least one groove passing from about the center thereof, extending away from the center an amount sufficient to provide free passage of air from the opening in the foot button diaphragm along the groove to the atmosphere when said piston is in its uppermost or non-depressed position, said groove not extending to the exterior periphery of said contact face of said piston so that when said piston is held in its downward position, no air escapes through the opening in the foot button diaphragm.

2. The improved, remote controlled valve and push button assembly of claim 1 wherein said at least one groove is radially disposed in said circular contact face.

3. The improved, remote controlled valve and push button assembly of claim 1 wherein there is one such groove in said contact face.

4. The improved, remote controlled valve and push button assembly of claim 2 further including an axially disposed blind opening extending upwardly from said face, said opening intersecting said at least one radially disposed groove.

5. An improved, remote controlled valve and dual push button assembly, the remote controlled valve being of the type which has a valve diaphragm including a closeable opening therethrough, said diaphragm being in the middle of a chamber which divides the chamber into an upper chamber and a lower chamber, wherein when the valve diaphragm moves downwardly, a magnet attracts a pilot orifice plate positioned below said chamber, causing the valve to open and when the pressure on both sides of the valve diaphragm is equalled, the valve diaphragm moves upwardly releasing the pilot orifice plate, thereby closing the valve and the push buttons connected to said valve being a hand operated push button of the type which contains a hand button diaphragm which, when depressed, ejects a small volume of control air and then, when released, intakes the same volume of air, which hand operated push button is connected to the lower of said chambers and upon intake, pulls the valve diaphragm downwardly causing the magnet to attract the pilot orifice plate, thereby holding the valve open for an amount of time required for metered air to pass through a needle valve connected to said lower chamber to release the pilot orifice plate, and the second push button being a foot operated button of the type which contains a foot button diaphragm which, when depressed by a piston, ejects a small volume of control air, which foot operated button is connected to the upper of said chambers and when the small volume of air is injected in the upper chamber, the valve diaphragm is moved downwardly causing the magnet to attract the pilot orifice plate for as long as the foot button is held down, wherein the improvement comprises:

check valve means located between said needle valve and the lower chamber, said needle valve means permitting the flow of air from the atmosphere inwardly through said needle valve and into said lower chamber, but preventing air from flowing outwardly from the needle valve into the atmosphere whereby when said foot operated push button is depressed, no air will escape from the lower chamber through the needle valve, and the pressure in the lower chamber will not decrease as the foot operated push button is held down.

6. The improved, remote controlled valve and push button assembly of claim 5 wherein said check valve is located in the needle valve body.

7. The improved, remote controlled valve and push button assembly of claim 5 wherein said check valve has an elastomeric body having a flattened cone at the interior end thereof and a slit through the flattened cone so that air will only pass in one direction through said slit.

8. An improved, remote controlled valve and dual push button assembly, the remote controlled valve being of the type which has a valve diaphragm including a closeable opening therethrough, said diaphragm being in the middle of a chamber which divides the chamber into an upper chamber and a lower chamber wherein when the valve diaphragm moves downwardly, a magnet attracts a pilot orifice plate positioned below said chamber, causing the valve to open and when the pressure on both sides of the valve diaphragm is equalled, the valve diaphragm moves upwardly releasing the pilot orifice plate, thereby closing the valve and the push buttons connected to said valve being a hand operated push button of the type which contains a hand button diaphragm which, when depressed, ejects a small volume of control air and then, when released, intakes the same volume of air, which hand operated push button is connected to the lower of said chambers and upon intake, pulls the valve diaphragm downwardly causing the magnet to attract the pilot orifice plate, thereby holding the valve open for an amount of time required for metered air to pass through a needle valve to release the pilot orifice plate, and the second push button being a foot operated button of the type which contains a foot button diaphragm which, when depressed by a piston, ejects a small volume of control air, which foot operated button is connected to the upper of said chambers and when the small volume of air is injected into the upper chamber, the valve diaphragm is moved downwardly for as long as the foot button is held down, wherein the improvement comprises:

air vent means in said foot operated button to permit the escape of air initiated by the depressing of the hand operated push button, which air has passed through the closeable opening in the valve diaphragm and to allow the escape of such air through said foot operated button when said foot operated button is in its non-depressed configuration, said air vent means comprising:

an opening through the foot button diaphragm at about the axial center thereof;

a piston having a circular contact face which contacts the diaphragm when the piston is depressed, said piston having at least one groove passing from about the center thereof, extending away from the center an amount sufficient to provide free passage of air from the opening in the foot button diaphragm, along the groove to the atmosphere when said piston is in its uppermost or non-depressed position, said groove not extending to the exterior periphery of said contact face of said piston so that when said piston is held in its downward position, no air escapes through the opening in the foot button diaphragm; and check valve means located between said needle valve and the lower chamber, said needle valve means permitting the flow of air from the atmosphere inwardly through said needle valve and into said lower chamber, but preventing air from flowing outwardly from the needle valve into the atmosphere whereby when said foot operated push button is depressed, no air will escape from the lower chamber through the needle valve, and the pressure in the lower chamber will not decrease as the foot operated push button is held down.

* * * * *